United States Patent

König et al.

[11] Patent Number: 5,830,418
[45] Date of Patent: Nov. 3, 1998

[54] METHOD OF USING ULTRASOUND TO PROMOTE CRYSTALLIZATION OF SOLID SUBSTANCES CONTAINED IN A FLOWABLE MATERIAL

[75] Inventors: Axel König, Stuttgart; Joachim Ulrich, Bremen, both of Germany

[73] Assignee: Santrade Ltd., Luzern, Switzerland

[21] Appl. No.: 640,872

[22] PCT Filed: Aug. 25, 1995

[86] PCT No.: PCT/EP95/03363

§ 371 Date: Jul. 15, 1996

§ 102(e) Date: Jul. 15, 1996

[87] PCT Pub. No.: WO96/07461

PCT Pub. Date: Mar. 14, 1996

[30] Foreign Application Priority Data

Sep. 7, 1994 [DE] Germany .................. 44 31 872.3

[51] Int. Cl.[6] .................................................. B01D 9/00
[52] U.S. Cl. ................ 422/245.1; 117/914; 422/251; 422/254
[58] Field of Search ............... 117/914; 422/128, 422/245.1, 251, 254

[56] References Cited

U.S. PATENT DOCUMENTS

| 3,513,212 | 5/1970 | Skrebowski et al. | 585/812 |
| 4,249,826 | 2/1981 | Studievic et al. | 422/939 |
| 4,279,579 | 7/1981 | Froeschke | 425/6 |
| 4,443,412 | 4/1984 | Schermutzki et al. | 422/245.1 |
| 4,610,615 | 9/1986 | Froeschke | 425/8 |
| 5,013,498 | 5/1991 | Froeschke | 264/8 |
| 5,395,593 | 3/1995 | Martin | 422/128 |

FOREIGN PATENT DOCUMENTS

| 0054328 | 6/1982 | European Pat. Off. . |
| 11 49 992 | 4/1985 | U.S.S.R. . |
| 2 089 230 | 6/1982 | United Kingdom . |
| 92 20420 | 11/1992 | WIPO . |

*Primary Examiner*—Felisa Garrett
*Attorney, Agent, or Firm*—Burns, Doane, Swecker & Mathis, L.L.P.

[57] ABSTRACT

A flowable material, such as a supercooled melt or supersaturated solution, is dispensed onto a take-up member such as a belt or drum. Either prior to, or after being dispensed onto the take-up member, the material is exposed to ultrasound to promote the crystallization of solid substances in the material. All of the material or only a portion of the material can be exposed to ultrasound. If only a portion is exposed, it is later combined with the rest of the material prior to being dispensed onto the take-up member.

12 Claims, 9 Drawing Sheets

METHOD OF USING ULTRASOUND TO PROMOTE CRYSTALLIZATION OF SOLID SUBSTANCES CONTAINED IN A FLOWABLE MATERIAL

BACKGROUND OF THE INVENTION

The present invention relates generally to the crystallization, is the solidification and/or separation, of solid substances that are contained in a melt or present in the form of a supersaturated solution.

Devices and methods for cooling and solidifying melts or supersaturated solutions have been known for a long time. The melt or supersaturated solution is dispensed in this case onto a take-up drum, which should be cooled if possible, or onto a receiving conveyor belt in a manner such that the solidified substances become deposited on the take-up drum or the conveyor belt in the form of a web of suitable thickness, which web of can then be broken into pieces of suitable size, if desired. Alternatively, the delivery onto the take-up drum or the conveyor belt could be effected in portions i.e., intermittently, which results in the formation of pellets that are easier to handle. Similarly, dispensing onto the take-up drum of the conveyor belt may be effected in strips, in which case the solidified substances will be available in the form of strips that can be cut easily to the desired lengths. Examples of methods of this kind, and of devices used for this purpose, are described in commonly owned U.S. Pat. No. 4,279,579, No. 4,610,615 and No. 5,013,498 by the assignee of record.

Further, it has been known from Skrebowski et al. U.S. Pat. No. 3,513,212 and European Publication No. 0 054 328 to employ ultrasound for the initiation and/or acceleration of crystallization processes in melts or solutions.

In the case of the known procedures for crystallizing and/or solidifying supercooled melts or supersaturated solutions it has, however, been found to be a problem to achieve such crystallization or solidification on the take-up drum or the receiving conveyor belt at exactly the desired and required point in time, or to achieve a sufficiently progressed or complete crystallization or solidification of the dispensed melt or solution on the take-up drum or the receiving conveyor belt within short periods of time.

It is, therefore, an object of the present invention to overcome the before-mentioned disadvantages and to enable the different melts or solutions to be crystallized or solidified under exactly adjusted conditions in terms of time and quantity.

SUMMARY OF THE INVENTION

This object is achieved by a procedure according to the invention, wherein the method for initiating and/or accelerating and/or directing the crystallization or separation of solid substances in supercooled melts or supersaturated solutions of solid substances comprises exposing the supercooled melt or supersaturated solution to ultrasound either prior to the melt or solution being dispensed onto a take-up member such as a drum or a conveyor belt of a conveyor system, or after being dispensed onto the take-up member.

Examples of melts or solutions, to which the invention may be applied, are solutions of $CaCl_2$, $MgCl_2$ and $Al_2(SO_4)_3$ and melts of wax or sulfur. The melts or solutions may additionally contain suspended substances. The melts or solutions may also be multi-component systems. The maximum temperature of such melts or solutions is, preferably, 500° Centigrade, in particular 350° Centigrade.

The statement "prior to being dispensed onto the" as used herein means that the melt or solution is exposed to the action of ultrasound before the supercooled melt or the supersaturated solution emerges from the dispensing device always present in such conveyor systems or drum systems, i.e. normally a short time before it emerges into the air gap between the dispensing device and the conveyor belt or take-up drum.

The statement "after being dispensed onto a take-up member" as used herein means that ultrasound is caused to act upon the conveyor belt or the take-up drum. This may be achieved, for example, by suitably coupling known or commercially available ultrasound sources with the conveyor belt or the take-up drum. Further, it is also a matter of course that the power of such ultrasound sources must be adapted to the power available and/or to the throughput of the melt or the solution, and their material composition. This can, however, be determined without particular expense by simple preliminary tests.

BRIEF DESCRIPTION OF THE DRAWING

The invention will now be described in more detail by reference to the drawing in which.

DETAILED DESCRIPTION OF PREFERRED EMBODIMENTS OF THE INVENTION

Figure 1:
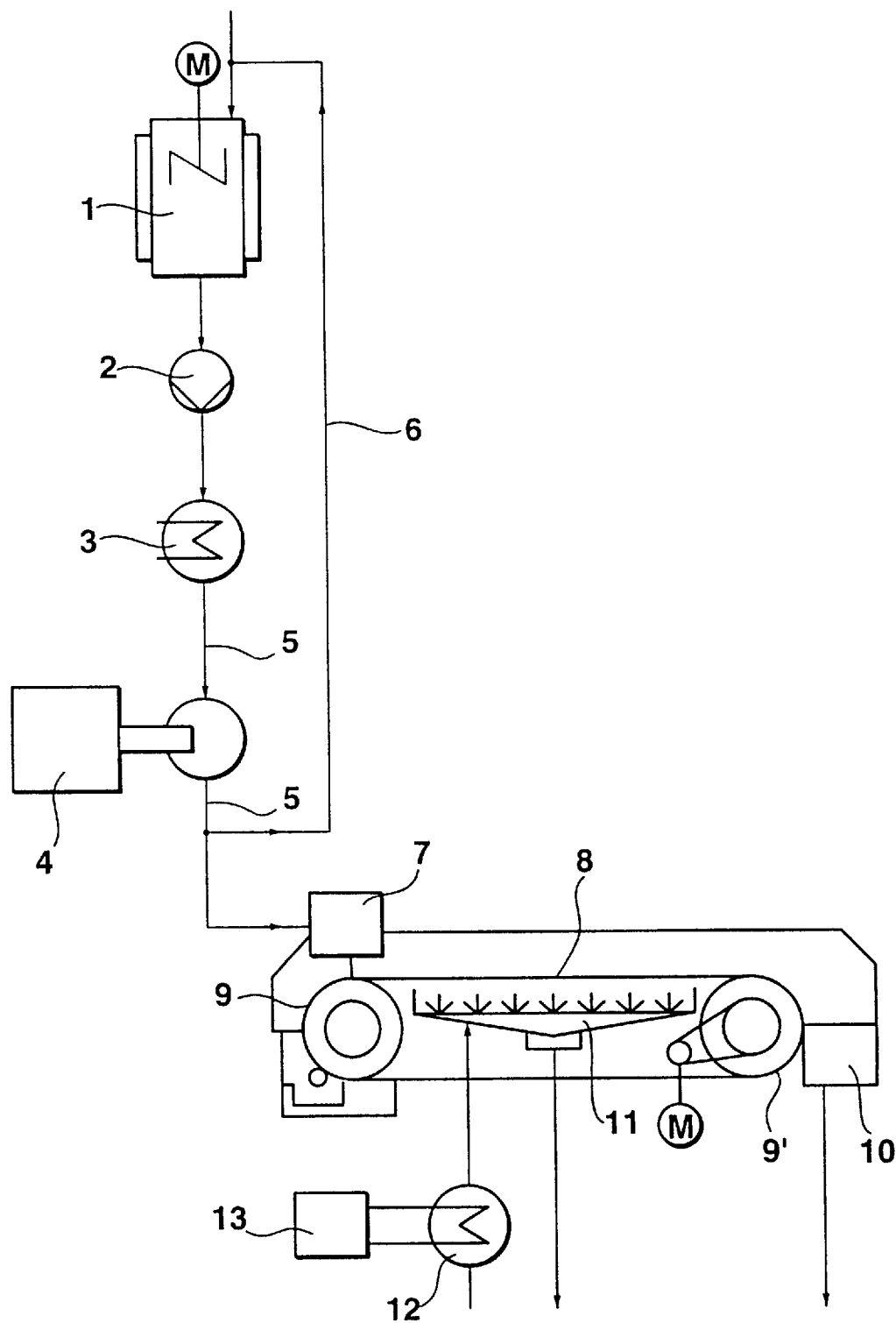
FIG. 1 shows an overall schematic view of a solidification system with a conveyor belt as a member take-up, and with ultrasound acting on the melt or solution according to the invention.

FIG. 1 shows an entire system for the crystallization or solidification of solid substances from a material such as a melt or a solution. A vessel, which is adapted for being heated and cooled and which conveniently includes an agitator, is designated by reference numeral 1 and contains the solution or melt which may already be cooled in the vessel, as desired. Reference numeral 2 indicates a control and dispensing system for the controlled delivery of material from the vessel 1. By means of a supercooler 3, melt or solution may be further cooled down to the desired and required temperature. An installation providing for the application of ultrasound is indicated by reference numeral 4. The system shown may be a commercially available ultrasound source installed in a section of the connection pipes 5. Ultrasound sources of different power, from some Watts to some Kilowatts, with different frequency ranges between several Kilohertz and several hundred Kilohertz, have been known for example under the trade name "SONOPLUS". In the case of the installation illustrated in FIG. 1, there is further provided a return line 6 which serves to establish temperature equilibrium conditions before the melt or solution is dispensed onto the take-up conveyor belt 8.

The melt or solution is delivered onto the conveyor belt 8 of the conveyor system A by means of a dispensing device 7; if the dispensing device 7 is suitably designed, dispensing may be effected in portions (i.e., intermittently) or in the form of strips or layers. The conveyor system A comprises guide and drive rollers 9, 9' for the conveyor belt 8, stripping means 10 for stripping off the melt or solution that has been delivered onto and has solidified on the conveyor belt 8, optional means for coating the conveyor belt 8 with a release agent, and a cooling device for the conveyor belt 8 comprising a trough 11 for cooling liquid, a cooling system 12 and a recirculation system 13.

Figure 2:
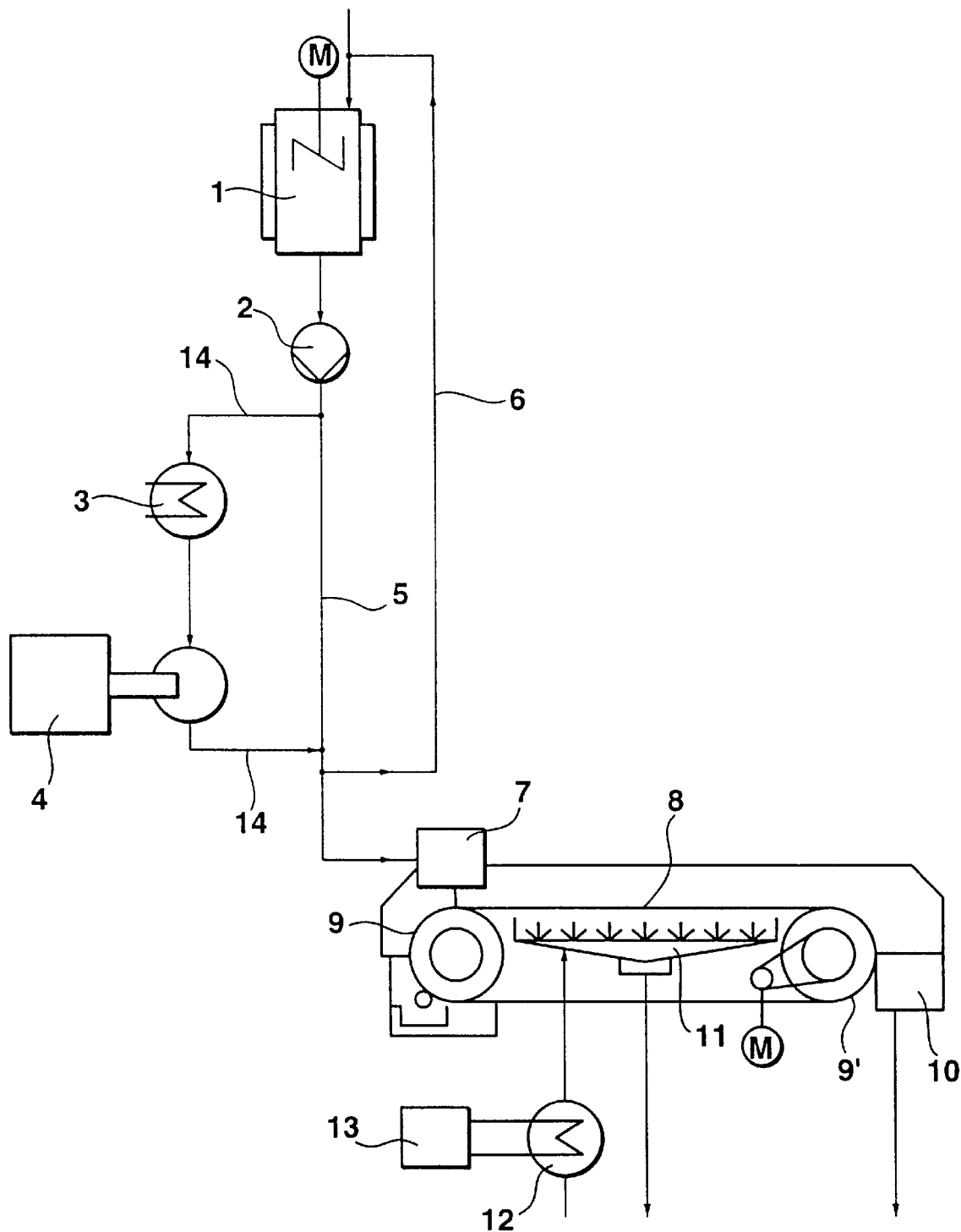
FIG. 2 shows an overall view of a system, similar to that of FIG. 1, but with only a partial flow of the melt or solution being exposed to the action of ultrasound.

FIG. 2 shows an overall system similar to that of FIG. 1, with the exception that in this case only a partial flow of the melt or solution delivered from the vessel 1 is exposed to ultrasound action. To this end, a by-pass line 14, in which the cooler 3 and the ultrasound source 4 are arranged, is provided in addition to the line 5.

The procedure according to the invention, where only part of the melt or solution is exposed to ultrasound action, enables an even more exact adjustment of the time or extent of crystallization or solidification to be achieved.

Figure 3:
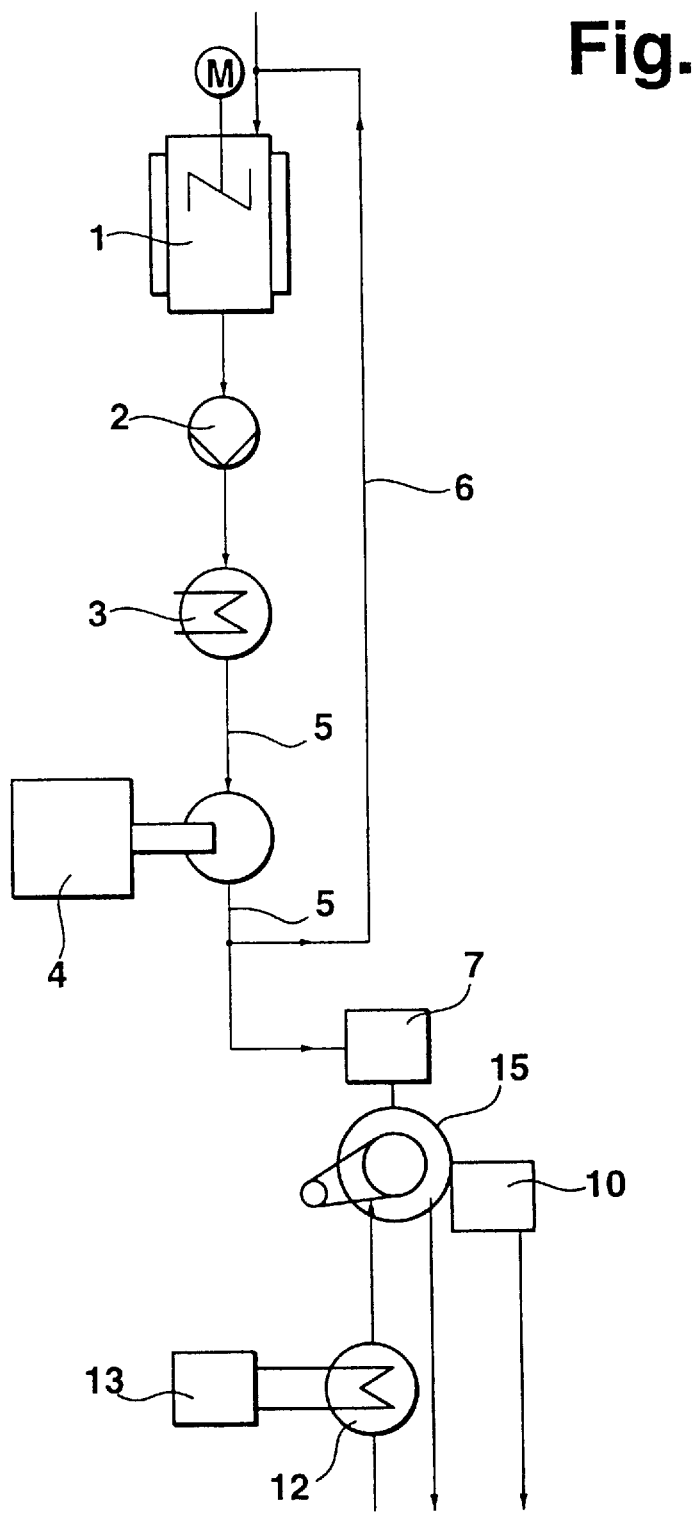
FIG. 3 shows an overall view of a solidification system with a take-up drum as a take-up member and with the ultrasound acting on the melt or solution.

FIG. 3 shows an overall system similar to that of FIG. 1, with the exception that instead of the conveyor system, a take-up drum is used for receiving the melt or solution dispensed by the dispensing means 7. For the rest, the same reference numerals have been used as in FIGS. 1 and 2. In the case shown in this drawing, the take-up drum receives the melt or solution and is cooled by means of a device corresponding to that shown in FIG. 1. It is understood that it is likewise possible, in the case of a take-up drum, to expose only a partial flow to ultrasound action, as illustrated in FIG. 2.

Figure 4:
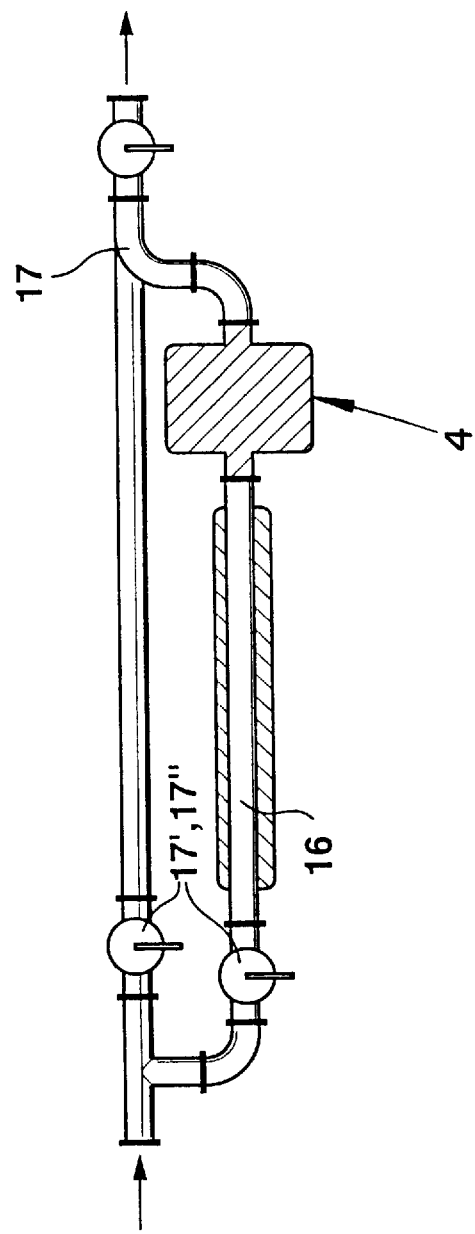
FIG. 4 shows a detailed view of a system, with the ultrasound acting on a partial flow only.

In FIG. 4, the arrangement of a by-pass line intended to expose only a partial flow to ultrasound action is illustrated in more detail. The ultrasound source is again indicated by reference numeral 4 and is preceded by an upstream supercooling line 16 corresponding to the supercooler 3 of FIG. 1. The illustrated arrangement further comprises valves 17, 17' and 17".

Figure 5:
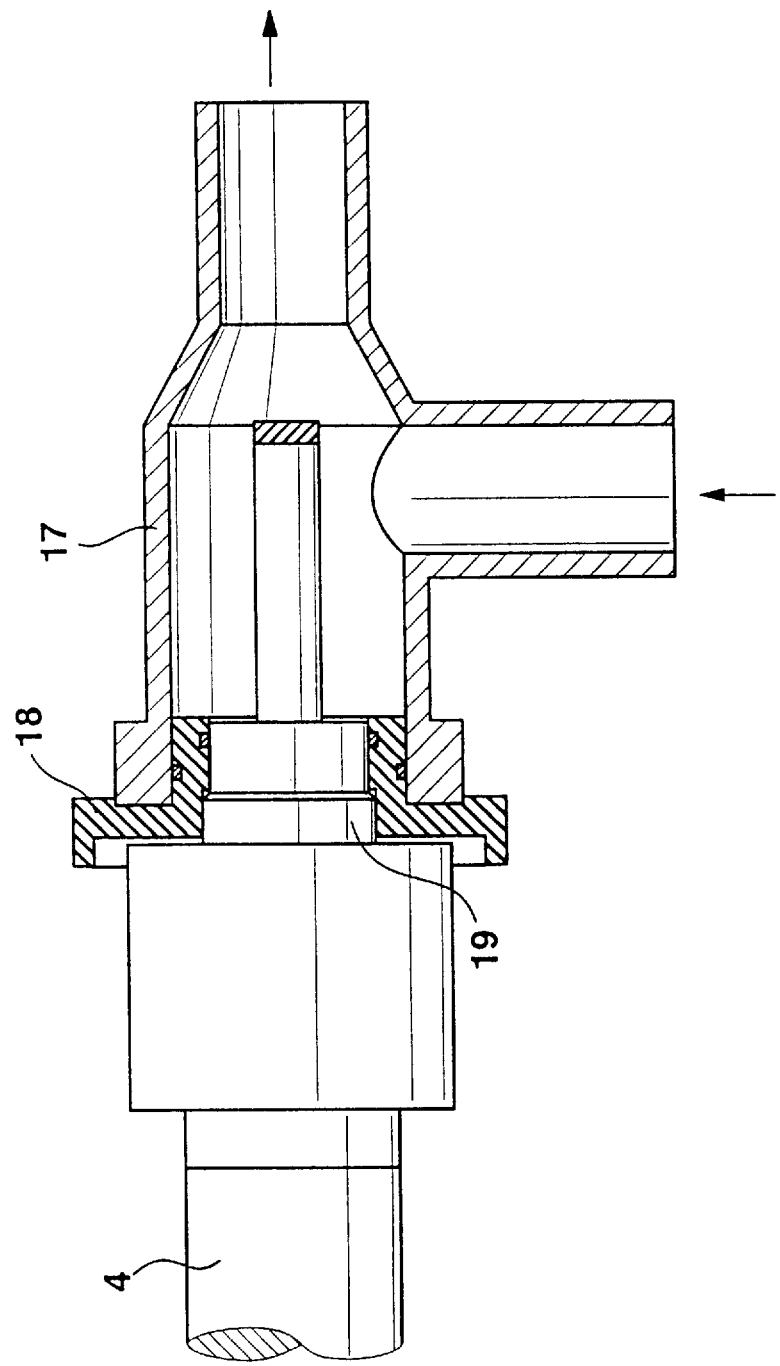
FIG. 5 shows a sectional view of an ultrasound source installed in a pipe system.

FIG. 5 shows a sectional view of an arrangement where the ultrasound source 4 is installed in the pipe system—not shown—by means of an elbow 17, especially a glass elbow. The connection flange and/or the connection piece of the ultrasound source 4 are indicated by reference numerals 18 and 19, respectively.

Figure 6:
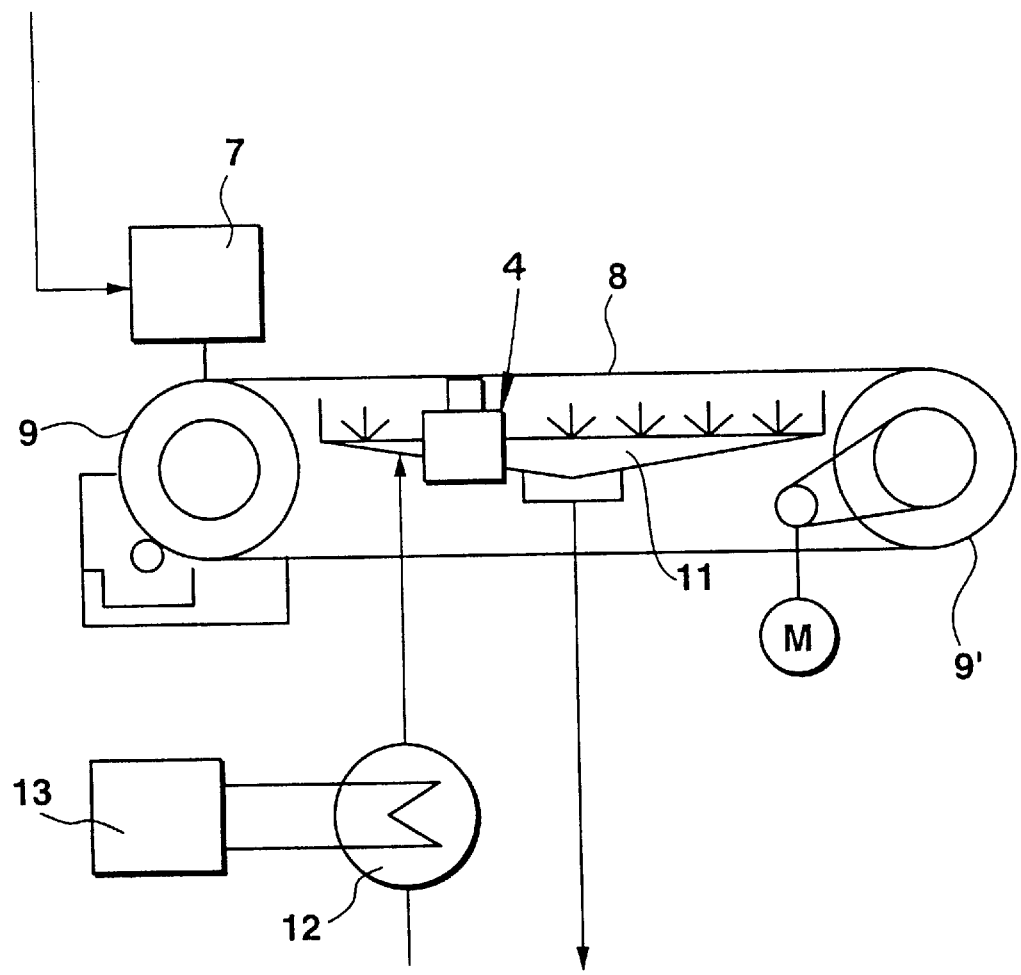
FIG. 6 shows a partial view of the arrangement for coupling the ultrasound source with a conveyor belt.

FIG. 6 shows one embodiment of the invention where the melt or solution is subjected to ultrasound action only after it has been deposited on the conveyor belt 8. As in the representation of FIGS. 1 and 2, the conveyor belt 8 is cooled by means of the liquid in the trough 11, so that the conveyor belt 8 must contact the surface of the cooling liquid in the trough 11. This can be achieved in a simple way by suitable pressing means, or by spraying the cooling liquid against the bottom face of the conveyor belt 8. The ultrasound source 4 is in this case arranged in the cooling liquid in the trough 11, which guarantees perfect coupling.

Figure 7:
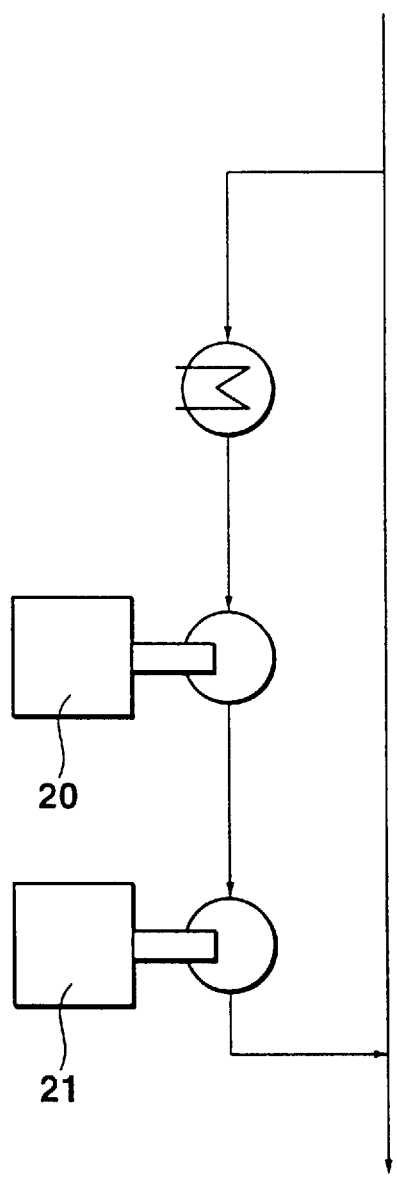
FIG. 7 shows a diagrammatic representation of an arrangement with multiple ultrasound action.

An arrangement where the ultrasound acts not only at a single point, but successively at two points, by means of the ultrasound transmitters 20 and 21, is illustrated diagrammatically in FIG. 7. This arrangement permits multiple nucleus formation at a distance in time.

Figure 8:
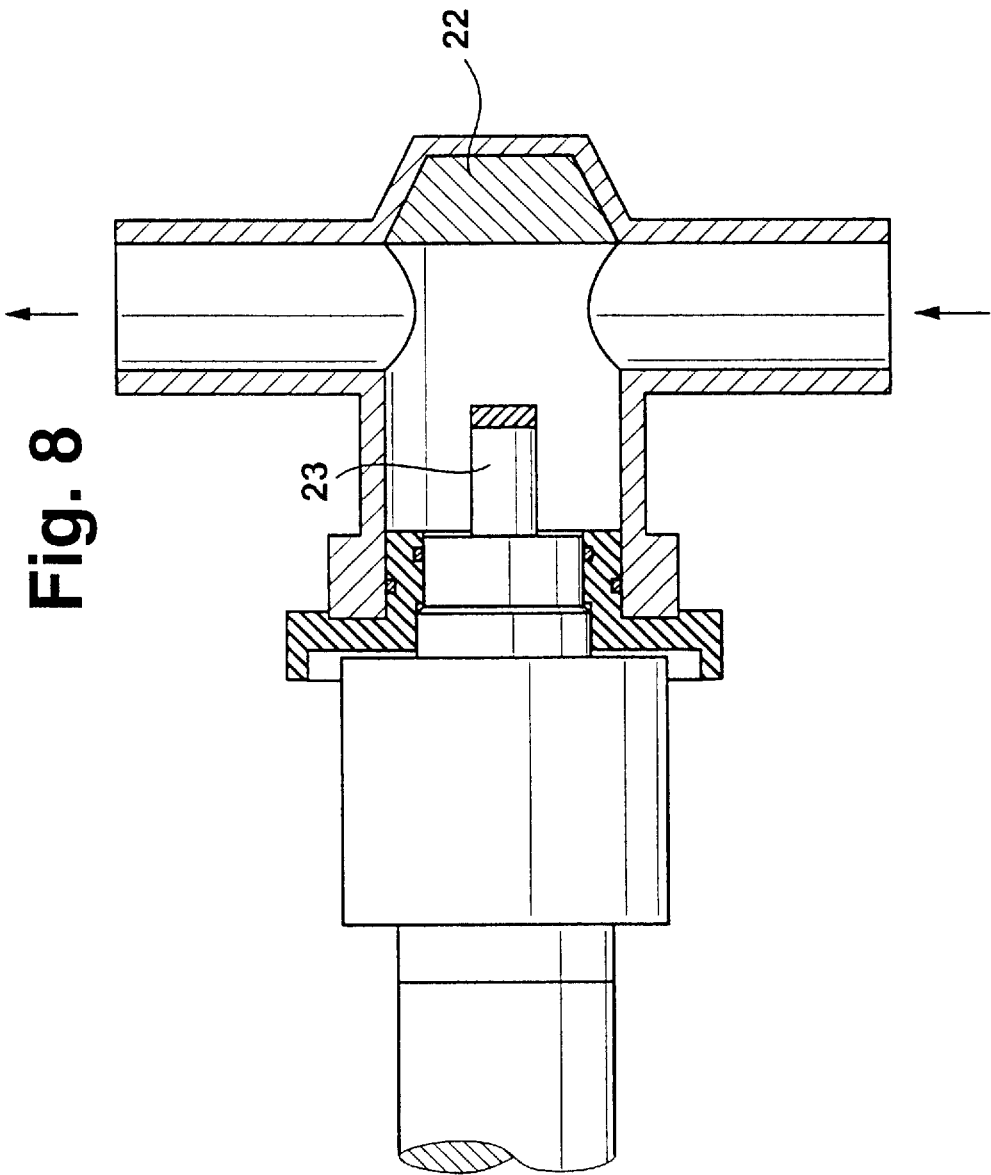
FIG. 8 shows a diagrammatic representation of an arrangement of an ultrasound source using an ultrasound reflector.

FIG. 8 shows a sectional view of an arrangement where an ultrasound source 4 is installed in a pipe system, similar to the arrangement of FIG. 5, with the exception that here an ultrasound reflector 22 is arranged opposite the head 23 of the ultrasound transmitter, whereby the ultrasound can be reflected and, thus, a higher degree of utilization of the ultrasound can be achieved.

Figure 9:
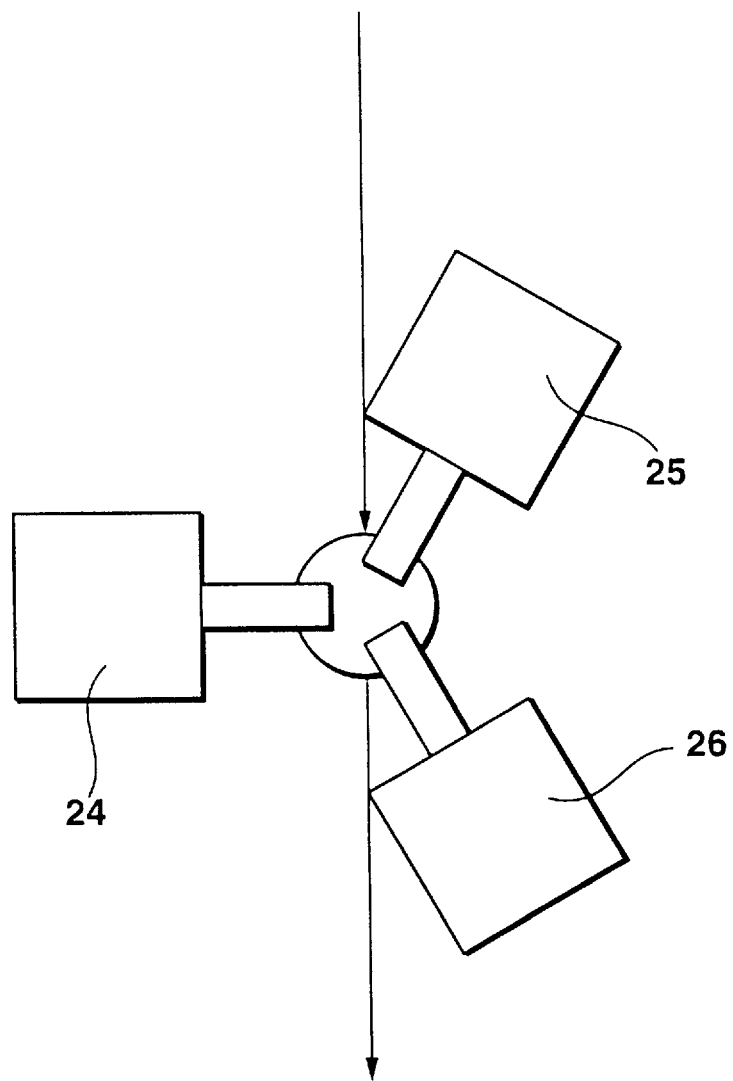
FIG. 9 shows a diagrammatic representation of an arrangement with the ultrasound acting from several sides.

FIG. 9 shows a diagrammatic representation of an arrangement with multiple ultrasound exposure at a single point, by means of three ultrasound sources 24, 25 and 26. This arrangement provides the advantage that it is possible to work with ultrasound transmitters of low power, and still to achieve a higher effect in a defined, relatively limited area. This in turn enables the ultrasound power to be bundled or focused in a small area or volume.

Instead of delivering a supercooled melt onto the receiving conveyor belt or take-up drum, the procedure according to the invention also provides the possibility in certain cases—especially in the case of quickly crystallizing melts—to deliver a melt that has been cooled to a point slightly above the solidification point and to quickly supercool that melt on the conveyor belt or the take-up drum as it is deposited thereon, while exposing it to ultrasound at the same time. It is thus possible to safely prevent any premature and undesirable solidification of melts before they emerge from the dispensing device.

We claim:

1. A method for promoting crystallization of solid substances contained in a flowable material which is dispensed onto a take-up member for hardening, the method comprising a step of exposing the material to ultrasound prior to hardening.

2. The method according to claim 1 wherein an exposing step is performed on the material before the material is dispensed onto the take-up member.

3. The method according to claim 2 wherein the exposing step comprises exposing only a portion of the material to the ultrasound.

4. The method according to claim 3 wherein the exposing step comprises separating the portion of the material from the rest of the material, exposing the portion of the material to ultrasound, and recombining the separated portion with the rest of the material prior to dispensing the material onto the take-up member.

5. The method according to claim 1 wherein an exposing step is performed while the material is on the take-up member.

6. The method according to claim 1 wherein the material is dispensed onto a take-up member in the form of a belt.

7. The method according to claim 1 wherein the material is dispensed onto a take-up member in the form of a drum.

8. The method according to claim 1 further including the step of cooling the take-up member.

9. The method according to claim 1 including the step of dispensing the material in the form of pieces onto the take-up member.

10. The method according to claim 1 wherein an exposing step is performed at more than one location along a travel path of the material.

11. The method according to claim 1 wherein an exposing step is performed at only a single location along a travel path of the material.

12. The method according to claim 1 wherein the material contains the substances in a state of suspension.

\* \* \* \* \*